(12) United States Patent
Sander et al.

(10) Patent No.: US 12,134,185 B2
(45) Date of Patent: Nov. 5, 2024

(54) COMPACT 6-AXIS POSITIONING SYSTEM

(71) Applicant: PHYSIK INSTRUMENTE (PI) GMBH & CO. KG, Karlsruhe (DE)

(72) Inventors: Christian Sander, Karlsruhe (DE); Rainer Gloess, Karlsruhe (DE); Christian Rudolf, Karlsbad (DE)

(73) Assignee: PHYSIK INSTRUMENTE (PI) GMBH & CO. KG (DE)

( * ) Notice: Subject to any disclaimer, the term of this patent is extended or adjusted under 35 U.S.C. 154(b) by 160 days.

(21) Appl. No.: 17/800,310

(22) PCT Filed: Feb. 24, 2021

(86) PCT No.: PCT/EP2021/054492
§ 371 (c)(1),
(2) Date: Aug. 17, 2022

(87) PCT Pub. No.: WO2021/170604
PCT Pub. Date: Sep. 2, 2021

(65) Prior Publication Data
US 2023/0064477 A1    Mar. 2, 2023

(30) Foreign Application Priority Data
Feb. 24, 2020   (DE) .................... 10 2020 104 731.2

(51) Int. Cl.
*B25J 17/02*   (2006.01)
*B23Q 1/54*   (2006.01)
*B25J 9/00*   (2006.01)

(52) U.S. Cl.
CPC ........ *B25J 17/0216* (2013.01); *B23Q 1/5462* (2013.01); *B25J 9/0045* (2013.01)

(58) Field of Classification Search
CPC .... B25J 9/0045; B25J 17/0216; B23Q 1/5462
See application file for complete search history.

(56) References Cited

U.S. PATENT DOCUMENTS

| | | | |
|---|---|---|---|
| 4,988,244 A | 1/1991 | Sheldon et al. | |
| 6,240,799 B1 | 6/2001 | Yau | |
| 6,330,837 B1 | 12/2001 | Charles et al. | |
| 2010/0122602 A1* | 5/2010 | Marcroft ............. | B25J 17/0216 901/18 |

FOREIGN PATENT DOCUMENTS

| | | |
|---|---|---|
| CN | 107134209 A | 9/2017 |
| CN | 107538231 A | 1/2018 |

(Continued)

OTHER PUBLICATIONS

English translation of CN 107134209 A (Year: 2017).*

(Continued)

*Primary Examiner* — Joseph Brown
(74) *Attorney, Agent, or Firm* — Harness, Dickey & Pierce, P.L.C.

(57) ABSTRACT

A 6-axis positioning system features a base, a movable unit, and six variable-length actuators divided into two groups of three actuators each. The actuators of the first group are positioned within a region bounded by the second group on both the base and the movable unit. Each end of the actuators is connected via pivot fastening systems, allowing precise movement. Specifically, the first group's actuators can move within an angular range of ±30° relative to a virtual line running perpendicular from the base, while the second group's actuators can move within an angular range of 0° to 45° relative to a plane spanned by the base. This arrangement ensures a compact, precise, and flexible positioning system, ideal for applications requiring high accuracy and load-bearing capacity.

13 Claims, 4 Drawing Sheets

(56) References Cited

FOREIGN PATENT DOCUMENTS

| | | |
|---|---|---|
| DE | 10060032 B4 | 7/2004 |
| EP | 1585903 A1 | 10/2005 |
| GB | 2505558 A | 3/2014 |
| JP | H05-500337 A | 1/1993 |
| JP | 2001-208157 A | 8/2001 |
| JP | 2006-513380 A | 4/2006 |
| JP | 2019-509790 A | 4/2019 |
| WO | 2004063579 A1 | 7/2004 |

OTHER PUBLICATIONS

Notice of Reasons for Refusal for corresponding Japanese Patent Application No. 2022-550769 dated Nov. 17, 2023, with English translation (14 Pages).
International Search Report (English and Deutsch) issued in PCT/EP2021/054492, mailed May 28, 2021; ISA/EP (7 pages).
Office Action issued in German Patent Application No. 102020104731.2 mailed Jan. 12, 2021 (10 pages).
Stoughton R S et al., "A Modified Stewart Platform Manipulator With Improved Dexterity", IEEE Transactions On Robotics and Automation, IEEE Inc, New York, US, vol. 9, No. 2, Apr. 1, 1993 (Apr. 1, 1993), pp. 166-173 (8 pages).
Yao J et al., "Spatially isotropic configuration of Stewart platform-based force sensor", Mechanism and Machine Theory, Pergamon, Amsterdam, NL, Feb. 1, 2011 (Feb. 1, 2011), vol. 46, No. 2, pp. 142-155 (14 pages).
Notice of Reasons for Refusal for corresponding Japanese Patent Application No. 2022-550769 dated May 10, 2024, with English translation (6 Pages).

* cited by examiner

COMPACT 6-AXIS POSITIONING SYSTEM

CROSS REFERENCE TO RELATED APPLICATIONS

This application is a U.S. National Phase Application under 35 U.S.C. 371 of International Application No. PCT/EP2021/054492, filed on Feb. 24, 2021, which claims priority to German Patent Application No. 10 2020 104 731.2, filed on Feb. 24, 2020. The entire disclosures of the above applications are expressly incorporated by reference herein.

BACKGROUND

Technical Field

The present invention relates to a 6-axis positioning system, comprising a base, a movable unit and six variable-length actuators. One end of each actuator is connected to the base, and the other end of each actuator is connected to the movable unit. The six actuators are divided into two groups each having three actuators. The actuators of the first group are arranged on the base within a region bounded by the actuators of the second group, and the actuators of the first group are arranged on the movable unit within a region bounded by the actuators of the second group. The lower end and the upper end of each of the three actuators of the second group are connected to the base and to the movable unit, respectively, by means of respective pivot fastening systems. The upper end of each of the three actuators of the first group is connected to the movable unit by means of a pivot fastening system.

Related Art

Such 6-axis positioning systems are also called hexapods and offer six degrees of freedom of movement in a compact space. The movable unit usually consists of a platform (movable unit) connected to the upper end of the actuators, on which elements or attachments to be positioned are arranged. 6-axis positioning systems are available in different sizes and for a wide range of applications. As components in the industrial production processes, hexapods can position high loads with submicrometer accuracy. For industrial applications, there are combinations of absolute measuring position sensors, suitable software and motion controllers that allow even complex motion profiles to be conveniently executed. A preferred drive for the actuators are brushless DC motors with brakes. The working space of such a 6-axis positioning system depends very much on the length of deployment ("telescoping") of the actuators. In particular, limitations in this respect arise for heavy-load 6-axis positioning systems, and efforts are underway to provide compact 6-axis positioning systems with extended working space for heavy-duty applications as well.

A generic positioning system is described in CN 107 134 209 A. This positioning system is designed as a heavy-duty positioning system and includes a base plate, a load platform, six external actuators, and three centrally located load balancing devices. The load balancing devices comprise an obliquely arranged hydraulic cylinder, which is indirectly connected to the base plate at its lower end, and a slide with a roller block arranged thereon is provided at its upper end. A pair of ropes fixed at one end is guided over this pulley block and attached at its other end to another slide. Both slides move along an obliquely arranged slide rail. On the lower slide there is hingedly arranged lower end of a support arm, the upper end of which is connected to the load platform. By retracting or extending the hydraulic cylinder, the upper slide and, via the cable pull, the lower slide are moved together with the support arm. Thanks to the cable pull, there is possible reduction.

DE 100 60 032 B4 relates to six-degrees-of-freedom parallel mechanism for micro-positioning work. The structure includes a base platform, a movable platform and three external links and internal links arranged in between. The links are designed as actuators. As it can be seen in particular from FIG. 4 of DE 100 60 032 B4, the lower ends of the outer links are arranged within the area bounded by the lower ends of the inner links. The upper ends of the internal links are connected to each other centrally and at a distance below the platform by a common spherical joint. The inner part of the spherical joint is connected to the platform. Due to this arrangement, the outer links have a more upright basic position than the inner links.

CN 107 538 231 A relates to a multi-axis positioning device comprising a lower platform, an upper platform, six obliquely arranged actuators and three support columns arranged in the center. The load is mainly taken up by the support columns. The support columns are shown in more detail in FIG. 3 of CN 107 538 231 A and comprise a linear guide at the upper end of which is a hinge device connected to the upper platform. The linear bearing is supported on a base by means of a pressure spring. The six actuators provide precise control. The problem of the invention, therefore, is to provide a 6-axis positioning system of the aforementioned type for a compact design, in particular a flatter design.

This problem is solved by a 6-axis positioning system with the unique features described below. Advantageous embodiments are also described below.

SUMMARY

In a 6-axis positioning system according to the invention, in this respect, the six actuators are divided into two groups, each having three actuators. Preferably, the actuators of different groups are also configured differently. The actuators of the first group are arranged on the base within a region bounded by the actuators of the second group, and the actuators of the first group are arranged on the movable unit within a region bounded by the actuators of the second group. The lower end and the upper end of each of the three actuators of the second group are connected to the base and to the movable unit, respectively, by means of respective pivot fastening systems, preferably with at least two pivot axes. The upper end of each of the three actuators of the first group is connected to the movable unit by means of a pivot fastening system, preferably with at least two pivot axes. The lower end of each of the three actuators of the first group is connected to the base, respectively, by means of a pivot fastening system that can be pivoted during adjustment operation of the 6-axis positioning system, preferably with at least two pivot axes. Further, the movable unit with extended working space can be moved around the ends of the actuators of the first group attached to the movable unit. In this way, it is possible to configure these three actuators of the first group to be shorter than the three actuators of the second group and, if necessary, to provide them with more lifting force. A kind of division of work between the actuators of the first group and the second group is thus possible, resulting overall in a more compact, in particular flatter, design with extended working space. This means that the actuators of both groups are actively and jointly engaged in the precise adjustment and exact positioning of the movable unit. In contrast, in both CN 107 134 209 A and CN 107 538 231 A, the six external actuators, which operate more precisely, are responsible for accurate adjustment and precise positioning, while the internal load balancing devices or support columns serve purely to support the load. Therefore, in a preferable variant of the present invention, there are also exactly three actuators of the first group and exactly three actuators of the second group, the precision of which is in particular equally good.

In the present case, as an act, also actuator, there are meant drive units which convert an electrical signal into mechanical movements or changes of physical quantities and thus actively intervene in the controlled or regulated process.

Preferably, the pivot fastening system of the three actuators of the first group on the movable unit and/or the pivot fastening system of the three actuators of the first group on the base can each be configured separately from one another, i.e. each actuator of the first group has a separate pivot fastening system on the movable unit and/or on the base, spaced apart from the other pivot fastening systems. Furthermore, the pivot fastening systems of the three actuators of the second group on the movable unit and/or the pivot fastening systems of the three actuators of the second group on the base can each be configured separately from one another, i.e. each actuator of the second group has a separate pivot fastening system on the movable unit and/or on the base that is spaced apart from the other swivel mountings.

In order for the three actuators of the first group to be able to absorb as high a stroke load as possible, according to one embodiment they are configured to be variable in length and are pivotably connected to the base and the movable unit in such a way that the three actuators of the first group are each arranged to be movable in an angular range of at most ±30°, preferably at most ±15°, relative to a vertical or perpendicular to a plane spanned by the base.

In the basic position, the base and also the movable unit are generally arranged horizontally, respectively, so that the angular reference to a vertical line results. In principle, however, 6-axis positioning systems can assume different angular positions per se, i.e., for example, the base can be tilted out of the horizontal, which is why a reference to a vertical is then advantageous. A plane spanned by the base is given, for example, by a plane containing the centers of the joints of the three actuators of a group.

Preferably, the three actuators of the second group can be variable in length and pivotally connected to the base and the movable unit in such a way that each of the three actuators of the second group is arranged in an angular range of ≥0° to a maximum of 45°, preferably ≥0° to a maximum of 30°, relative to a horizontal line or parallel to a plane spanned by the base. The three actuators of the second group are therefore generally arranged much flatter than the three actuators of the first group. In such an arrangement, the three actuators of the second group require a higher positioning path. This is only possible if these three actuators are moved laterally past the three actuators of the first group.

The three actuators of the first group can be configured as primarily load-bearing actuators in particular if, according to one embodiment, they have the same length in a basic position and, in this basic position, the main axes of the three actuators of the first group are arranged parallel to a vertical or a perpendicular to a plane spanned by the base. In this basic position, these three actuators of the first group can take almost the entire load alone, while the three actuators of the second group are primarily used for positioning. With a corresponding change in the length of the actuators, the ratios then shift, with the main lift load still being carried by the three actuators of the first group.

According to a further embodiment, it is provided that the three actuators of the second group are variable in length and pivotably connected to the base and the movable unit in such a way that, during a stroke movement of the three actuators of the first group from a minimum to a maximum stroke position while maintaining the basic position, each of the three actuators of the second group is arranged movably in an angular range of ≥0° to at least 15°, preferably ≥0° to at least 30°, relative to a horizontal or parallel to a plane spanned by the base. At its extreme, the three actuators of the second group can therefore be positioned flat or horizontally in the minimum stroke position and at an acute angle in the maximum stroke position. Overall, this results in a very flat and compact design.

Although standard and also identical parts can also be used, it is preferred if the three actuators of the first group and the three actuators of the second group are configured differently. According to a preferred embodiment, the three actuators of the first group are designed as heavy-load actuators, with a greater load capacity than the three actuators of the second group. Preferably, the three actuators of the first group have at least twice the load capacity of the actuators of the second group. Especially for eccentrically acting loads, it is advantageous if the actuators of the first group are capable of carrying at least five times as much load as those of the second group.

Furthermore, since the three actuators of the first group are to be arranged within the area bounded by the actuators of the second group on the base and a movable unit, it is preferable when this is accomplished in a certain predictable manner, thus enabling also a better load distribution to be obtained, if necessary. According to one embodiment, it is provided that the centers of the pivot fastening systems of the three actuators of the first group lie on the base and/or the movable unit on a first circular line and the centers of the pivot fastening systems of the three actuators of the second group lie on the movable base and/or the movable unit on a corresponding second circular line, and the first circular line lies within the correspondingly associated second circular line on the base and/or the movable unit, preferably the first circular line is positioned concentrically to the correspondingly associated second circular line on the base and/or on the movable unit. Only the two circular lines on the base or the two circular lines on the movable unit are compared.

In this context, it may further be provided that the area on the base and/or the movable unit bounded by the first circular line is at least twice as small, preferably at least three times as small, and further preferably at least four times as small as the area on the base and/or the movable unit bounded by the correspondingly associated second circular line. In this way, it is ensured that the three actuators of the first group are grouped as compactly and centrally as possible on the 6-axis positioning system and that sufficient space is available for the corresponding configuration of both the three centrally arranged actuators and the actuators located further outwards.

In accordance with the work distribution of the actuators, in a further embodiment it is provided that the length of the three actuators of the second group is at least 1.5 times, preferably at least 2 times, greater than the length of the three actuators of the first group when the actuators of the first group are in a central position.

Furthermore, a 6-axis positioning system according to another embodiment may be configured so that the movable unit has recesses or windows into which at least one component or attachment of or to the three actuators of the second group is inserted in a fully retracted position of the three actuators of the first group. Despite possible components (e.g. a brushless DC motor or a gearbox) or attachments, for example, a completely horizontal arrangement of the actuators of the second group is possible in this position because any obstructing components do not collide with the movable unit but can be accommodated in recesses or windows. This contributes to a large extent to further compactness.

The grouping of the actuators enables other arrangement forms. Preferably, it is provided that the connecting lines of the center points of the pivot fastening systems of the three actuators of the first group on the base and on the movable unit, respectively, span a triangle, and that connecting lines of the center points of the pivot fastening systems of the three actuators of the second group on the base and on the movable unit, respectively, span a triangle, the correspondingly associated triangles on the base and on the movable unit having the same orientation of their corners, or being rotated by a maximum angle of 45° to one another. Only the two triangles on the base or the two triangles on the movable unit are compared.

The grouping of the actuators also allows a different configuration of the base and/or the movable unit. According to an advantageous embodiment, the base and/or the movable unit may or may not have a triangular shape with preferably rounded corners. These elements then take only the required dimension.

In particular, an embodiment that makes use of standard components is advantageously configured in such a way that, in a fully retracted position of the three actuators of the first group, each of the main axes of the three actuators of the second group is inclined by a maximum of ±15°, preferably parallel, to an adjacent side edge of the respective associated spanned triangle and/or the adjacent side edge of the triangular shape(s) of the base and/or the movable unit. In particular, when the three actuators of the second group are arranged in parallel, the triangular shapes of the base and the movable unit are aligned in the same way, in the best case congruent and aligned parallel to each other.

In another embodiment, it is advantageously provided that in a fully retracted position of the three actuators of the first and second groups, the main axes of the three actuators of the second group are each arranged inclined in a range of 15° to 45°, preferably about 30°, with respect to the adjacent side edge of the associated spanned triangle and/or the adjacent side edge of the triangular shape(s) of the base and/or the movable unit. This leads to the fact that the adjustment effect of the three actuators of the second group is increased and also there is achieved more space for the arrangement of the three actuators of the first group. This gives room for specially configured actuators. In a preferred embodiment and using a 30° angle, the triangular shapes of the base and the movable unit may then be correspondingly rotated 30° with respect to each other. Here it is then possible to move the attachment points for the actuators of the second group correspondingly further outwards, in particular to the corners of the associated triangular shapes.

The actuators used in the present case for the first and/or the second group are drive units which have a receiving device from which or into which a movable adjustment device (e.g. an adjustment piston) can be telescopically extended and retracted, the receiving device being attached to the base and the movable adjustment device being attached to the movable unit, or the receiving device being attached to the movable unit and the movable adjustment device being attached to the base. The actual controlled or regulated drive unit is preferably located in and/or on the receiving device.

BRIEF DESCRIPTION OF THE DRAWINGS

In the following, embodiments of the present invention are explained in more detail with reference to drawings. The following are shown.

DETAILED DESCRIPTION

Figure 1:
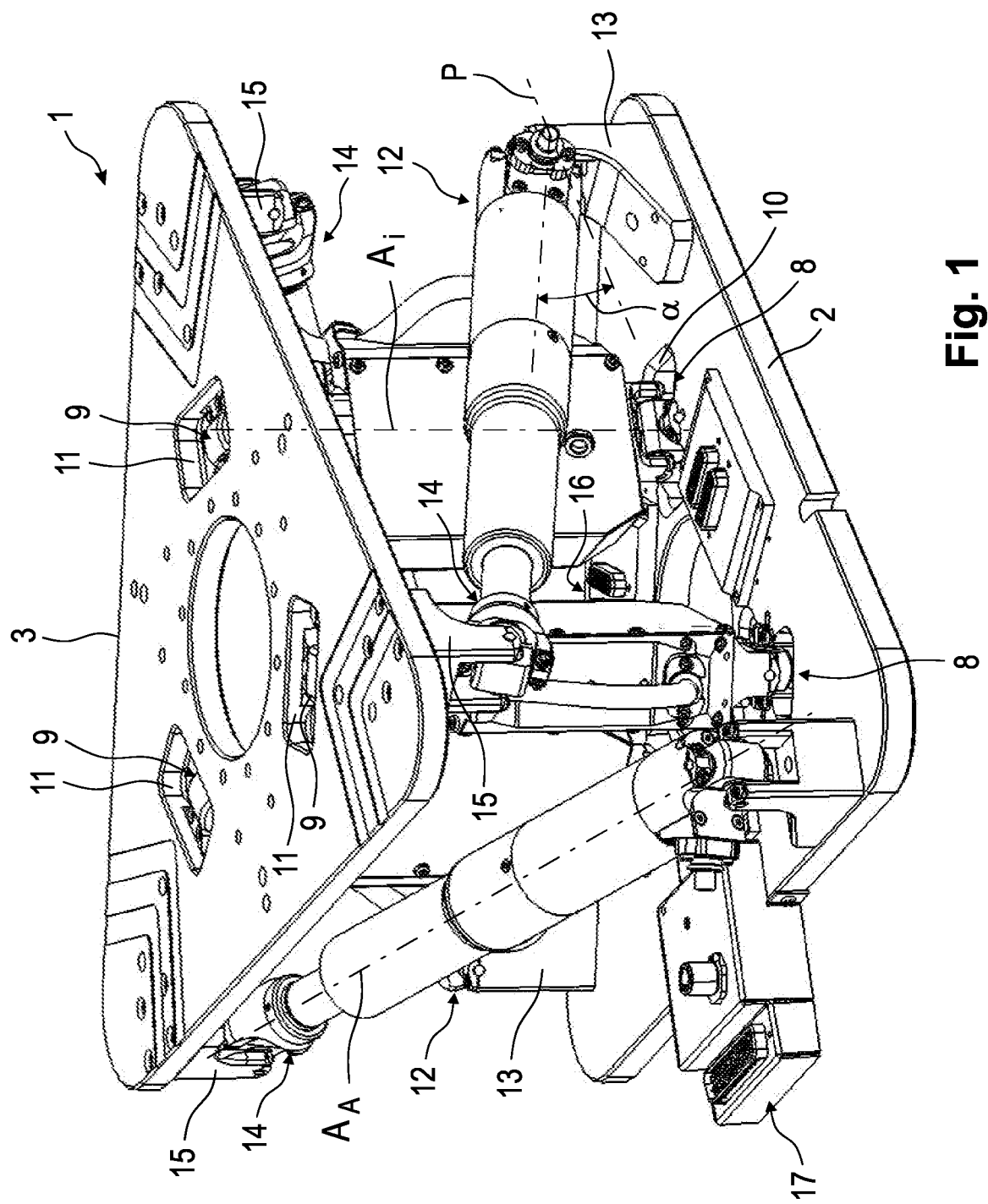
FIG. 1 is a perspective view of a first embodiment of a 6-axis positioning system according to the invention.
Figure 2:
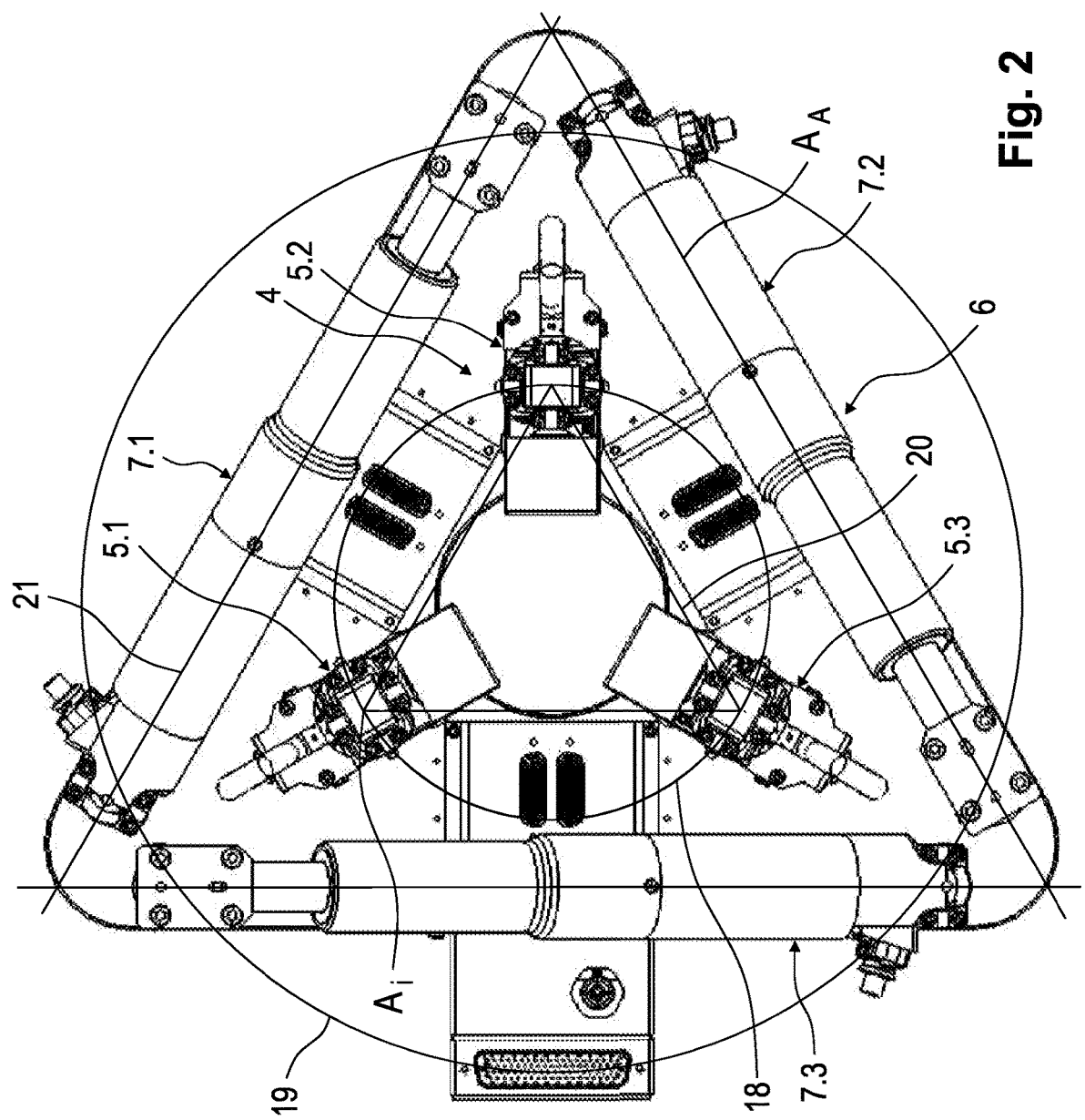
FIG. 2 is a top view of the 6-axis positioning system shown in FIG. 1, with the movable unit skipped for clarity.

The first embodiment of a 6-axis positioning system 1 shown in FIGS. 1 and 2 has a base 2 in the form of a triangular platform and a movable unit 3 also in the form of a triangular platform, as well as actuators arranged between them that are to be described in more detail. Each of the base 2 and the movable unit 3 is formed by a plate of substantially uniform thickness, preferably of a metal, such as steel. The actuators arranged between the base 2 and the movable unit 3 are grouped into a first group 4 comprising actuators 5.1, 5.2 and 5.3 and a second group 6 comprising actuators 7.1, 7.2 and 7.3. Actuators 5.1, 5.2 and 5.3 differ in function and configuration from actuators 7.1, 7.2 and 7.3, while the actuators of a respective group 4 or 6 have the same configuration. The actuators 5.1, 5.2 and 5.3 of the first group 4 are pivotally arranged with their lower ends 8 on the base 2 and with their upper ends 9 on the movable unit 3. The pivotable arrangement is in the form of a universal joint (cardan joint), so that pivoting movements about two axes are possible. For a more compact arrangement, the base 2 has a window recess 10 for mounting the lower end 8 of each of the actuators 5.1, 5.2, and 5.3 so that an axis of the universal joint is mounted within the window recess 10. Similarly, the movable unit 3 is provided with three window recesses 11 for the pivotable arrangement of the upper ends 9 of the actuators 5.1, 5.2 and 5.3. Again, an axle of the corresponding universal joint is fixed in the window recess 11.

A lower end of the actuators 7.1, 7.2 and 7.3 is pivotally arranged on a respective bearing block 13 arranged on the base 2. For the pivotable arrangement, a universal joint is again used for pivoting about two axes. In a similar way, an upper end 14 of the actuators 7.1, 7.2 and 7.3 is arranged by means of a bearing block 15 attached to the movable unit 3. Also at the upper end 14, the pivoting arrangement is made by means of a universal joint for pivoting about two axes.

Due to the selected arrangement, the actuators 5.1, 5.2 and 5.3 of the first group 4 are arranged more upright than the actuators 7.1, 7.2 and 7.3 of the second group 6. Also helpful for such an arrangement are the window recesses 10 and 11 and the two bearing blocks 13 and 15. Each of the window recesses 10 and 11 is located further inwardly of the base 2 or movable unit 3 compared to the corresponding bearing blocks 13 or 15, respectively. Through this, the actuators 5.1, 5.2, 5.3 of the first group 4 are arranged within an area bounded by the actuators 7.1, 7.2, 7.3 of the second group 6 on the base 2 or the movable unit 3. Since the load is applied from above via the movable unit 3, it is also possible that the main load is taken up by the actuators 5.1, 5.2, 5.3. These are therefore configured as heavy-duty actuators, which have a much higher load capacity than the three actuators 7.1, 7.2, 7.3 of the second group 6. All 6 actuators are adjustable in length (telescopic) and are driven by a brushless DC motor. The control is carried out by means of the connector platforms 16 as well as the connector 17. In this way there is provided the current and voltage supply. Sensors (displacement sensors, etc.) are not shown in the drawings. However, the basic operation and control of 6-axis positioning systems are known per se, which is why they will not be discussed in detail here. In any case, the movable unit 3 can be both raised, lowered or shifted relative to the base 2 and tilted about all three spatial axes. The adjustability of the actuators 5.1, 5.2, 5.3 and 7.1, 7.2 and 7.3 as well as their arrangement determines the possible working space. Owing to the drive technology used, there is possible very precise control and positioning, even in the present area of heavy loads.

In FIG. 1 and FIG. 2, the 6-axis positioning system is shown in a basic position in which the base 2 and the movable unit 3 are aligned parallel to each other, i.e. the actuators 5.1, 5.2 and 5.3 of the first group 4 have the same length and the actuators 7.1, 7.2 and 7.3 of the second group 6 have the same length. Furthermore, actuators 5.1, 5.2 and 5.3 are in their central position, which is why actuators 7.1, 7.2 and 7.3 also assume their central position. In this basic position, the actuators 5.1, 5.2 and 5.3 are aligned exactly vertically with their main axes $A_j$, i.e. they are perpendicular to a plane spanned by the base 2. In this position, the actuators 7.1, 7.2 and 7.3 have an angle α to the horizontal or a parallel P to a plane spanned by the base 2 of approximately 20°.

The advantage of the embodiment shown in FIGS. 1 and 2 is that already known actuators can be used here and there is not required any construction. Nevertheless, this results in a very compact and flat design of a 6-axis positioning system.

From FIG. 2, it can be seen that the connection centers (crossing point of the universal joint) of the actuators 5.1, 5.2 and 5.3 on the movable unit 3 is arranged on a circular line 18. The same applies to the arrangement of the connection centers at the lower end 8 on the base 2. The connection centers (e.g., intersection of the universal joints) of the actuators 7.1, 7.2 and 7.3 are located on the movable unit 3 on a circular line 19. Similarly, the connection points of the lower ends 12 are also located on a circular line 19. The circular lines 18 and 19 belonging to the base 2 and the circular lines 18 and 19 belonging to the movable unit 3 are arranged concentrically to each other. The area surrounded by the circular line 18 is substantially smaller than the area surrounded by the circular line 19 (at least twice as small, preferably three times as small, and further preferably at least four times as small). This results in the compact grouping which, among other things, ensures that a relatively large pivoting can take place even with a small stroke of actuators 5.1, 5.2 and 5.3. Nevertheless, exact positioning is possible in the interaction of actuators 5.1, 5.2 and 5.3 as well as 7.1, 7.2 and 7.3.

In the central position of the actuators 5.1, 5.2 and 5.3 shown in FIGS. 1 and 2, the actuators 7.1, 7.2 and 7.3 of the second group 6 are considerably longer than the actuators of the first group 4 (at least 1.5 times, preferably at least 2 times, larger). Accordingly, the maximum adjustment path of an actuator 7.1, 7.2 and 7.3 of the second group 6 is substantially greater than the maximum adjustment path of an actuator 5.1, 5.2 and 5.3 of the first group 4 (at least 1.5 times, preferably at least 2 times, greater).

Furthermore, it can be seen from FIG. 2 that each of the centers of the pivot fastening systems of the three actuators 5.1, 5.2 and 5.3 of the first group 4 spans a triangle 20 on the base 2 and also on the movable unit 3. Each of the connecting lines of the centers of the pivot fastening systems of the three actuators 7.1, 7.2 and 7.3 of the second group 6 on the base 2 and also on the movable unit 3 also spans a triangle 21. In the basic position shown, the triangles 20 and 21 have the same orientation, which incidentally also corresponds to the orientation of the triangular shapes of the base 2 and the movable unit 3. Accordingly, the main axes $A_A$ of the three actuators 7.1, 7.2 and 7.3 of the second group 6 each run parallel to a side edge of these spanned triangles 20, 21 or the triangular shapes of the base 2 and the movable unit 3 in the basic position.

In the following, the mode of action and operation of the preceding embodiment is explained in more detail.

Targeted control of the drives of actuators 5.1, 5.2 and 5.3 as well as 7.1, 7.2 and 7.3 results in targeted positioning of the movable unit 3 relative to the base 2. A desired 6-axis positioning within a given working space is possible. The main load is carried by actuators 5.1, 5.2 and 5.3 of the first group 4 during lifting and lowering. These are therefore configured as corresponding heavy-load actuators so that considerable loads can be moved. The actuators 5.1, 5.2 and 5.3 of the first group 4 pivot only by a limited angular range with respect to a vertical or perpendicular to a plane spanned by the base 2 (maximum±30°, preferably maximum±15°. Actuators 7.1, 7.2 and 7.3 are also adapted to pivot only by a limited angular range (from about 20° to a maximum of 45°, preferably from about 20° to a maximum of 30°) to a horizontal or parallel line P to a plane spanned by base 2.

For example, by shortening or telescoping the actuators 7.1, 7.2 and 7.3 of the second group 6 and correspondingly pivoting and lengthening the actuators 5.1, 5.2 and 5.3 of the first group 4, the movable unit 3 can be rotated relative to the base 2, even without necessarily changing the distance. Overall, the required path of actuators 7.1, 7.2 and 7.3 is greater than that of actuators 5.1, 5.2 and 5.3.

All in all, the result is a 6-axis positioning system that is compact, especially flat, and can carry heavy loads. This is achieved by grouping and dividing the functions of the two groups of actuators accordingly.

Figure 3:
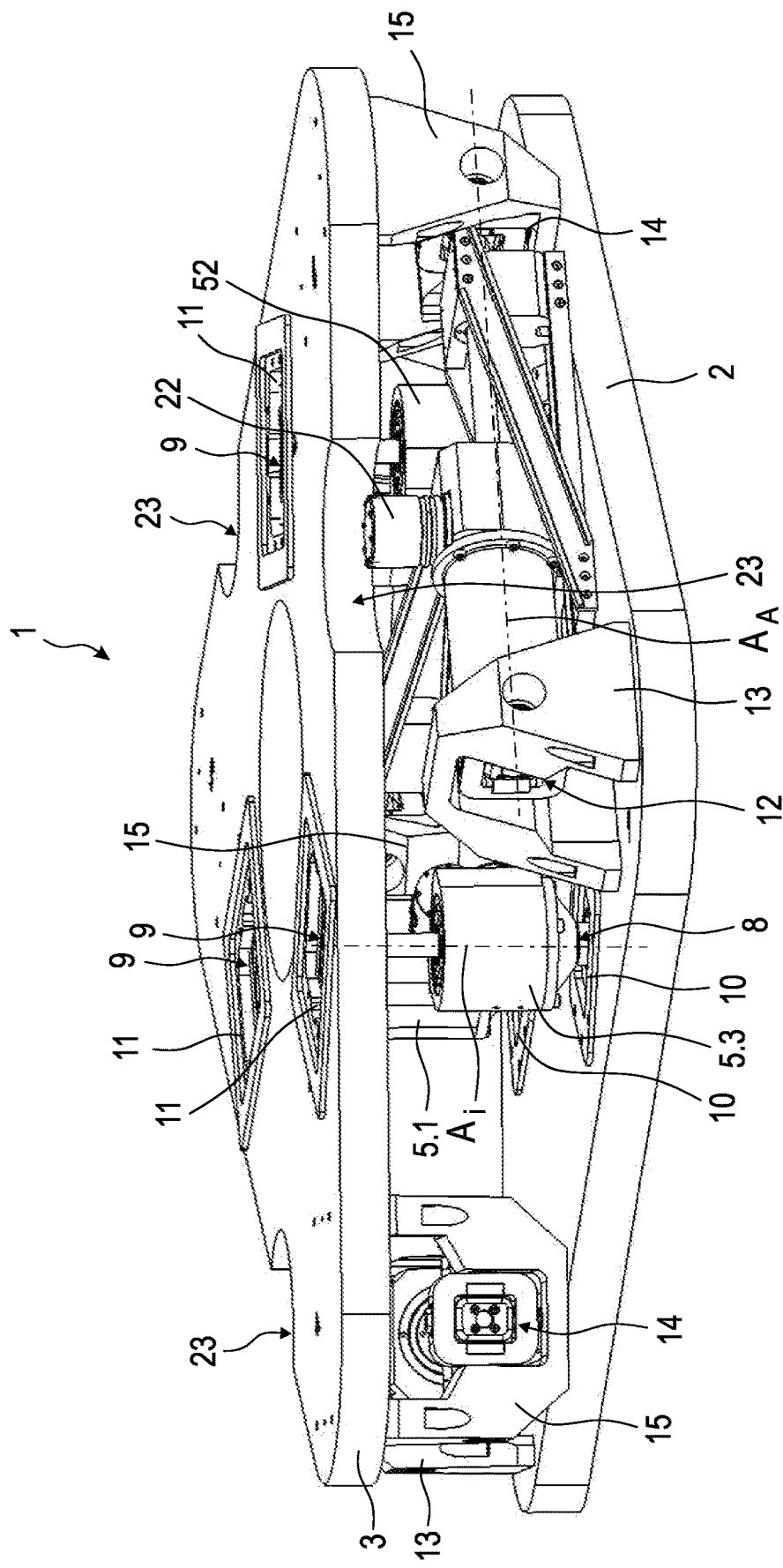
FIG. 3 is a perspective view of a second embodiment of a 6-axis positioning system according to the invention.
Figure 4:
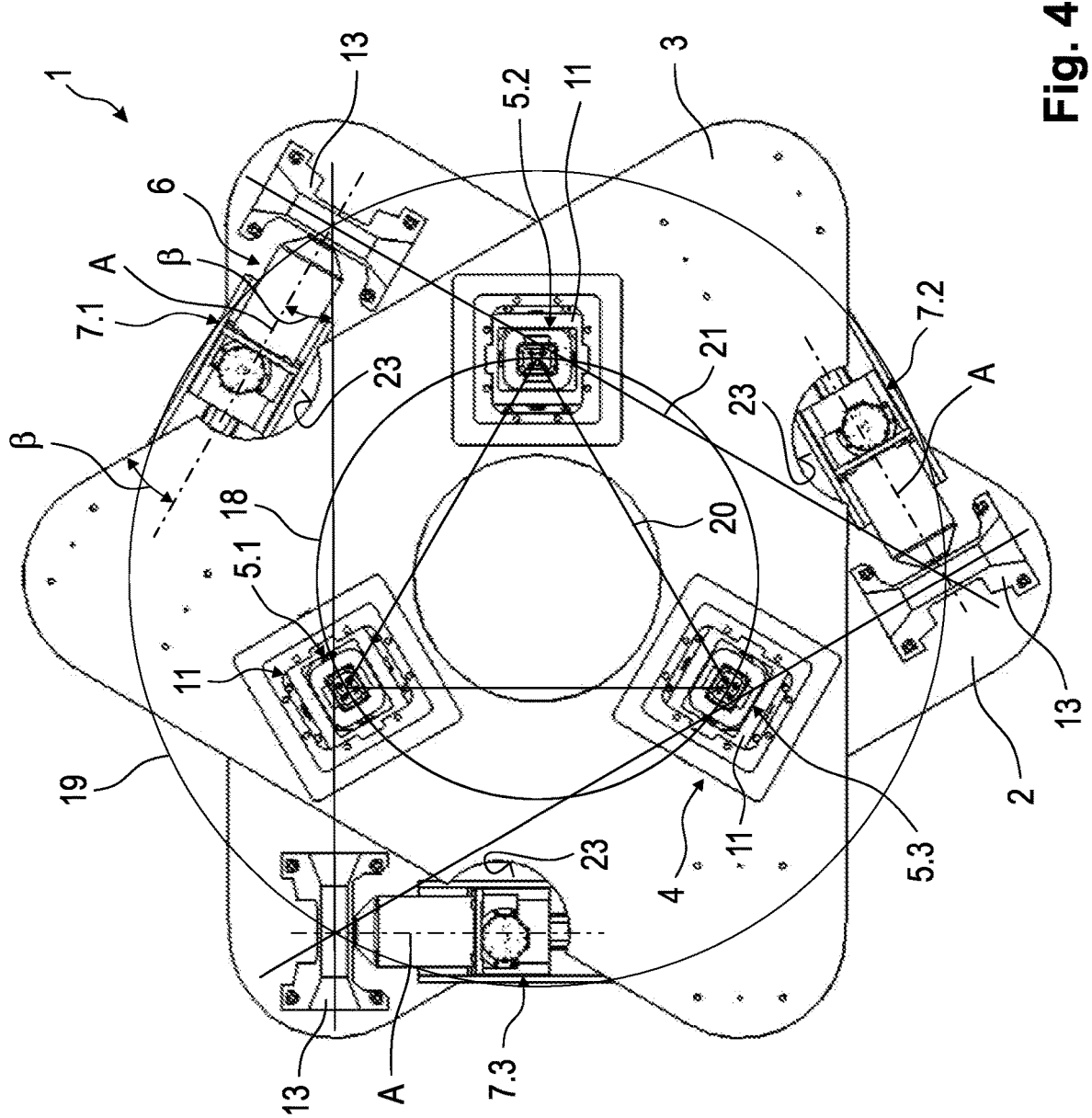
FIG. 4 is a top view of the 6-axis positioning system from FIG. 3.

With reference to FIGS. 3 and 4, a second embodiment of a 6-axis positioning system 1 according to the invention will now be explained in more detail. In the following, only the main differences to the previous embodiment will be discussed. Therefore, using the same reference numbers for similar components, reference is made to the above description as a supplement and only the essential differences are concentrated on.

The 6-axis positioning system 1 shown in FIGS. 3 and 4 has once again been specially configured using specifically adapted actuators. The actuators 5.1, 5.2 and 5.3 are even more compact in the retracted position, i.e. less long, and the actuators 7.1, 7.2 and 7.3 can be arranged with their main axis $A_A$ horizontal or parallel to a plane spanned by the base 2 in the fully retracted position of the actuators 5.1, 5.2 and 5.3 (see in particular FIG. 3). This results in an even more compact, in particular flatter, configuration of the 6-axis positioning system 1.

Another significant difference is the positioning, i.e. grouping, of actuator groups 4 and 6 relative to each other. From FIG. 4, it can first be seen that the triangular base 2 and the triangular movable unit 3 are arranged rotated by 30° with respect to each other in the basic position. For this purpose, the bearing blocks 13 and 15 and the corresponding actuators 7.1, 7.2 and 7.3 are placed at an angle on the base 2 and also at an angle to the movable unit 3 in the basic position. That is, in a fully retracted position of the three actuators 5.1, 5.2 and 5.3 of the first and second groups 4 and 6, the main Axes $A_A$ of the three actuators 7.1, 7.2 and 7.3 of the second group 6 are respectively arranged at about 30° to the side edges of the corresponding spanned triangle 21 and/or the side edges of the triangular shapes of the base 2 and the movable unit 3. This also means that the main Axes $A_A$ of the actuators 7.1, 7.2 and 7.3 are parallel to the side edges of the triangle 20 in the basic position shown (FIG. 4). Accordingly, the window recesses 10 and 11 or the attachment points on the base 2 and the movable unit 3 are also placed correspondingly rotated by 30° with respect to the respective triangular shape of the base 2 or the movable unit 3. The corresponding bearing blocks 13 and 15 can also be made more stable as a result and have an inverted U-shape.

Actuators 7.1, 7.2 and 7.3 have attachments 22. This can be, for example, the brushless DC motor, which is moved more to the center of the actuator 7.1, 7.2 and 7.3. This attachment 22 protrudes in the direction of the movable unit 3. In the laid flat position of actuators 7.1, 7.2 and 7.3 shown in FIG. 3, each would collide with the movable unit 3. Therefore, the movable unit 3 has a recess 23 in each of these areas, in which the attachment 22 is received. The recesses 23 are selected to be large enough to allow suitable movements of the movable unit 3 to be performed, i.e., including rotation relative to the base 2, without causing collision of the attachment 22 and the movable unit 3.

Actuators 7.1, 7.2 and 7.3 are also in their central position in the basic position shown in FIGS. 3 and 4. Starting from this basic position, these can pivot in an angular range of an acute angle α (from ≥0° to a maximum of 45°, preferably ≥0° to a maximum of) 30° to a horizontal or parallel line P to a plane spanned by the base 2.

Due to the grouping and specialization of the actuator groups 4 and 6, there results said flat and very compact configuration of a high-load 6-axis positioning system. Loads of up to 2 t and more can be moved in this way with suitably dimensioned 6-axis positioning systems and positioned precisely within the working space provided.

It should also be noted that for reasons of clarity FIGS. 3 and 4 do not show the connector platform 16 and the connector 17. In accordance with the embodiment mentioned first, the 6-axis positioning system 1 shown is actuated and controlled by an interaction of the six actuators.

The invention claimed is:

1. A 6-axis positioning system, comprising:
a base;
a movable unit; and
six variable-length actuators, one end of each actuator being connected to the base and another end of each actuator being connected to the movable unit,
wherein the six actuators are divided into two groups each having three actuators, and the actuators of the first group are arranged on the base within a region bounded by the actuators of the second group, and the actuators of the first group are arranged on the movable unit within a region bounded by the actuators of the second group;
wherein a lower end and an upper end of each of the three actuators of the second group are connected to the base and to the movable unit, respectively, by respective pivot fastening systems;
wherein an upper end of each of the three actuators of the first group is connected to the movable unit by a pivot fastening system;
wherein a lower end of each of the three actuators of the first group is connected to the base by a pivot fastening system that pivots during an adjustment operation of the 6-axis positioning system;
wherein the three actuators of the first group are variable in length and pivotably connected to the base and the movable unit so that each of the three actuators of the first group is movable only in an angular range of a maximum of ±30° relative to a first virtual line extending perpendicular to a plane spanned by the base; and
wherein the three actuators of the second group are a variable in length and pivotably connected to the base and the movable unit so that each of the three actuators of the second group is arranged to be movable only in an angular range of ≥0 to a maximum of 45° relative to a second virtual line extending parallel to the plane spanned by the base.

2. The 6-axis positioning system according to claim 1, wherein the three actuators of the first group have the same length in a basic position and, in the basic position, main axes of the three actuators of the first group are arranged perpendicular to the plane spanned by the base.

3. The 6-axis positioning system according to claim 2, wherein, the three actuators of the second group are variable in length and pivotably connected to the base and the movable unit so that, during a stroke movement of the three actuators of the first group from a minimum to a maximum stroke position while maintaining the basic position, each of the three actuators of the second group is movable in an angular range of ≥0° to at least 15° relative to the second virtual line horizontally or parallel to the plane spanned by the base.

4. The 6-axis positioning system according to claim 1, wherein the three actuators of the first group are configured as heavy-load actuators, which have a higher load capacity than the three actuators of the second group.

5. The 6-axis positioning system according to claim 1, wherein centers of the pivot fastening systems of the three actuators of the first group lie on the base and/or the movable unit on a first circular line,
centers of the pivot fastening systems of the three actuators of the second group lie on the movable base and/or the movable unit on a corresponding second circular line, and
the first circular line lies within the correspondingly associated second circular line on the base and/or the movable unit.

6. The 6-axis positioning system according to claim 5, wherein an area on the base and/or the movable unit bounded by the first circular line is at least twice as small as an area on the base and/or the movable unit bounded by the correspondingly associated second circular line.

7. The 6-axis positioning system according to claim 1, wherein a length of the three actuators of the second group is at least 1.5 times greater than a length of the three actuators of the first group when the three actuators of the first group are in a central position in which the main axes of the three actuators of the first group are perpendicular to the plane spanned by the base.

8. The 6-axis positioning system according to claim 1, wherein the movable unit has recesses or windows into which at least one component or attachment of or to the three actuators of the second group is inserted in a central position of the three actuators of the first group, wherein in the central position, the main axes of the three actuators of the first group are perpendicular to the plane spanned by the base.

9. The 6-axis positioning system according to claim 1, wherein a maximum adjustment path of an actuator of the second group is at least 1.5 times greater than a maximum adjustment path of an actuator of the first group.

10. The 6-axis positioning system according to claim 1, wherein centers of the pivot fastening systems of the three actuators of the first group on the base are respectively located at vertices of a first virtual triangle on the base, and centers of the pivot fastening systems of the three actuators of the first group on the movable unit are respectively located at vertices of a second virtual triangle on the movable unit, centers of the pivot fastening systems of the three actuators of the second group on the base are respectively located at vertices of a third virtual triangle on the base, and centers of the pivot fastening systems of the three actuators of the second group on the movable unit are respectively located at vertices of a fourth virtual triangle on the movable unit, and the first and third virtual triangles on the base and the second and fourth virtual triangles on the movable unit respectively have an identical orientation of their corners or are rotated relative to each other by a maximum angle of 45°.

11. The 6-axis positioning system according to claim 10, wherein, in a central position of the three actuators of the first group, each of the main axes of the three actuators of the second group is arranged inclined in a range from 15° to 45° to an adjacent side edge of the corresponding spanned triangle and/or an adjacent side edge of the triangular shape of the base and/or of the movable unit, wherein in the central position, the main axes of the three actuators of the first group are perpendicular to the plane spanned by the base.

12. The 6-axis positioning system according to claim 1, wherein the base and/or the movable unit has a triangular shape.

13. The 6-axis positioning system according to claim 10, wherein, in a central position of the three actuators of the first group, each of the main axes of the three actuators of the second group is inclined by a maximum of ±15° to an adjacent side edge of the respectively associated spanned triangle and/or an adjacent side edge of the triangular shape of the base and/or the movable unit, wherein in the central position, the main axes of the three actuators of the first group are perpendicular to the plane spanned by the base.

* * * * *